March 23, 1965    J. J. MOYNIHAN, JR    3,174,794
WINDOW CONSTRUCTIONS FOR CONVERTIBLE TOPS
Filed May 8, 1963    2 Sheets-Sheet 2

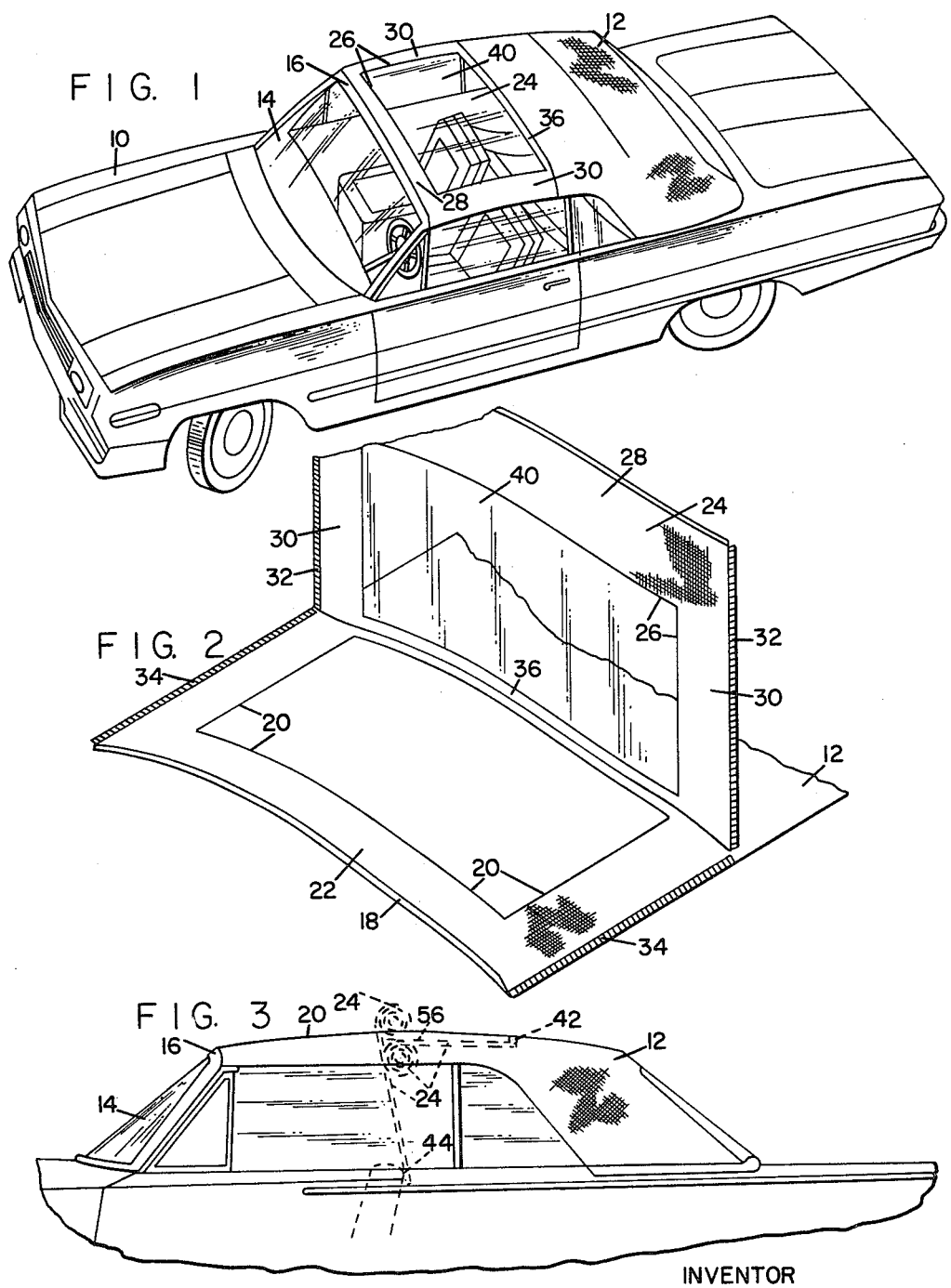

INVENTOR
JOHN J. MOYNIHAN, JR

BY *Charles R. Fay,*
ATTORNEY

United States Patent Office 3,174,794
Patented Mar. 23, 1965

3,174,794
WINDOW CONSTRUCTIONS FOR
CONVERTIBLE TOPS
John J. Moynihan, Jr., 4 Homer St., Worcester, Mass.
Filed May 8, 1963, Ser. No. 278,856
5 Claims. (Cl. 296—137)

This invention relates to a new and improved window construction for convertible tops for vehicles, and the principal object of the invention resides in the provision of a convertible top for a vehicle in which is incorporated a window which can be opened and including means for making the same wind and water-tight when in closed position; the provision of a more or less conventional convertible top construction but having an opening in it, whether the top is manually retractable or retractable by power operated means as is usual in the art, and including a flexible closure member which is detachably connected to the convertible top at the forward portion thereof near the bow at the front of the convertible top in such a way as to be clamped between the top frame member of the windshield and the bow, so that when the window is closed, the bow clamps the forward edge thereof to the windshield construction, rendering the same completely air and water-tight, and including separable fastening means for the forward portion of the closure member for attachment to the convertible top.

Other objects of the invention include the provision of a window and closure for it for convertible tops for vehicles as above stated including a transparent portion thereof forming a skylight; means for folding the window closure when in opened position under the convertible top completely out of sight; and the provision of extra wide lateral wings together with fasteners therefor at the side portions of the window closure as well as at the front portion thereof to hold the same selectively in closed position.

The invention further relates to arrangements and combinations of parts which will be hereinafter described and more particularly set forth in the appended claims.

Reference is to be had to the accompanying drawings, in which:

FIG. 1 is a perspective view illustrating the invention;

FIG. 2 is a perspective view on an enlarged scale showing the relationship of the new window construction to the soft top of the vehicle;

FIG. 3 is a view in side elevation, with parts in section and broken away, illustrating the disposition of the window in various relationships;

Figure 4:
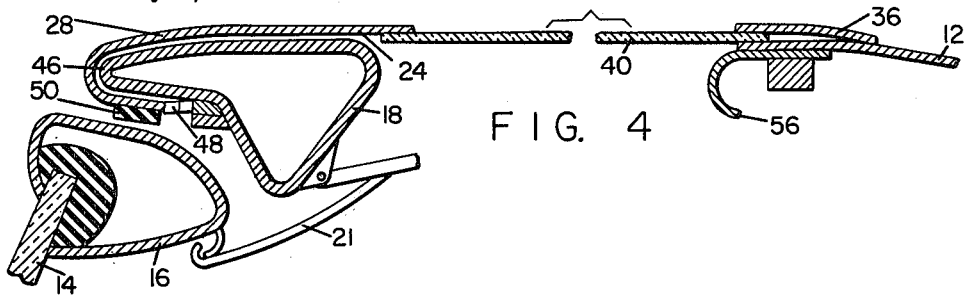
FIG. 4 is a sectional view on an enlarged scale illustrating the construction for securing the front portion of the window in closed condition.

As shown in FIG. 1 there is illustrated a conventional vehicle 10 commonly known as a convertible having a soft foldable or retractable top 12 of any ordinary or usual construction and which may be retracted by power or manually into the usual boot or otherwise at the rear of the rear seat of the vehicle as is well known in the art. The vehicle includes a windshield 14 of usual construction, this windshield being contained in a rigid frame having a top frame member 16 shown in some detail in FIGS. 4 and 5.

As conventional in convertible soft tops of the class under consideration, there is provided a forward header or bow generally indicated by the reference numeral 18. This header or bow is completely conventional and it is adapted to be clamped into a tight relationship with respect to the top frame member 16 of the windshield by use of the conventional clamp or similar device as illustrated at 21. This stretches and holds top 12 in position. When it is desired to retract the convertible soft top, these clamps are released and the top is retracted and folded. The clamps are repositioned to clamp the bow 18 tightly to the frame member 16 in rain and air-tight condition when the top is in extended condition as shown in FIG. 1.

The invention in the present case includes the provision of an opening in the convertible soft top, this opening being indicated at 20 and forming in general merely an opening in the fabric of the soft top 12.

Covering the opening there is provided a rectangular flexible member 24 which may be of any kind of fabric, plastic or any suitable material that can be rolled up. This panel has an opening 26 generally conforming to the opening 20. It has a forward portion at 28, the leading edge of which is provided with fasteners which may be of any well known type such as conventional slide fasteners and at its sides it is provided with two flexible members 30, 30, each having slide fasteners or the like 32 at the edges thereof. The slide fasteners 32 find their complementary fastening portions at 34, 34 along the side edges of the top 12 as clearly shown in FIG. 2, located well spaced from the side edges of opening 20. There is a strip of material at 36 similar to that at 30 and this is secured as for instance by adhesives or sewing to the top 12 transversely thereof just to the rear of the opening 20, also as clearly shown in FIG. 2.

The closure 24 is conveniently provided with a clear flexible window member 40 which is preferably flexible and the general purpose of the closure 24 is to cover the opening 20 but at the same time providing for a view therethrough. Also this closure can be opened and can be rolled up to the rear on top of the convertible soft top 12 or under it (see FIG. 3), or of course it can be merely pivoted down through the opening 20 and attached to the under side of the top 12 as indicated at 42, or to the back of the front seat as indicated at 44. Convenient straps or other fasteners can be used to hold the folded or rolled window where desired.

In the form of the invention shown in FIG. 4, the forward portion of the closure 24 is long enough to extend around and over the leading edge 46 of the header or bow 18 of the retractable top, and this bow 18 is provided with a slide fastener element 48 along the same at the under side thereof to the rear of its leading edge 46 for cooperation with the slide fastener elements on the window portion at 28. Also if desired a rubber strip or gasket may be applied thereto as at 50.

When the slide fastener 48 is attached to its complement, it will be seen that the header or bow 18 is covered and lapped at its forward edge, and when this bow is then tightly clamped by the conventional convertible clamps 21 to the frame 16, a joint is provided which is completely rain and air-proof, and the wind cannot get under it to move it up and rip it as would be the case were the member 24 to be applied to the bow 18 at the top portion thereof. This is a very important aspect to the present invention as it makes it effective to drive at any speed desired or in any weather conditions without agitation of the top closure by the wind or entry of rain.

Figure 5:
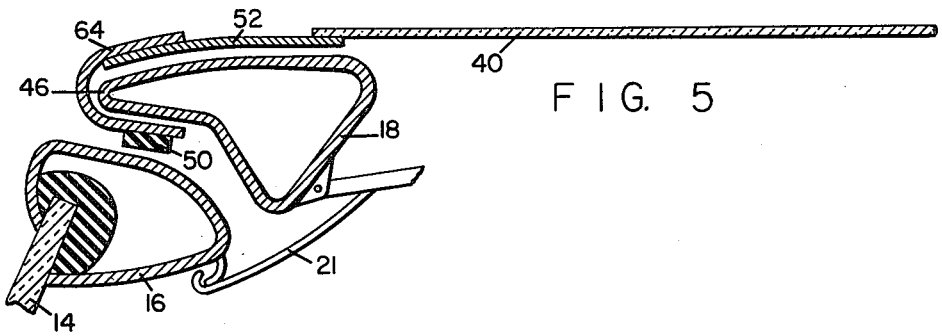
FIG. 5 is a similar view illustrating a modification.
Figure 6:
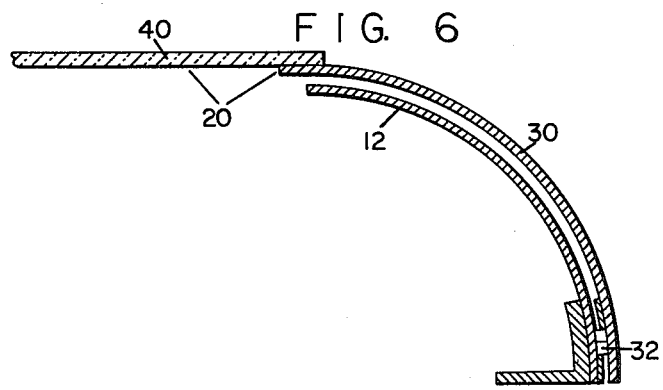
FIG. 6 is a sectional view illustrating the side edge construction of the window.

Looking at FIG. 5, however, there is seen here that the window portion 40 can be provided with a forward flexible member 52 to which can be attached a rigid channel member 54 complementary to the forward portion 46 of the bow 18. In this case it is merely necessary to stretch fabric enough to snap the formed channel member 54 over the header or bow at the leading edge portion 46 thereof and then when the aforesaid usual clamp 21 is utilized to clamp bow 18 to frame member 16, the gasket at 50 will once more form the tight connection which is wind and waterproof and at the same time will prevent air from being forced under the forward edge of the window construction 24 and disrupt the same. The edge portions 30, 30 overlap the edge portions of the top 12 and no leakage is possible at these sides either.

An opaque shade 56 is used if desired and can be held by a part of the top underneath the same. This shade is held across the opening 20 by slide fasteners, snaps, etc., and it may be folded down under the top as in FIG. 3 or rolled, etc., as well known in the art, thus covering or uncovering the transparent window member 40.

Having thus described my invention and the advantages thereof, I do not wish to be limited to the details herein disclosed, otherwise than as set forth in the claims, but what I claim is:

1. The combination of a convertible vehicle soft top having a forward bow for releasable clamping attachment with respect to a top frame member for a windshield for the vehicle, said convertible top having an opening therein extending rearwardly from adjacent the bow to a position intermediate the ends of the convertible top, with a flexible closure member for said opening, said closure member being secured at an edge thereof to the convertible top adjacent to the rear edge of the opening in the convertible top and having a length to extend forwardly over and completely close the opening, and means for securing the forward end of the closure member to the convertible top adjacent the bow, selectively completely closing the opening in the top, the forward edge of the closure member extending forwardly beyond and partially around said bow so that when the closure member is in closed position and the bow is clamped to the top frame member of the windshield, the forward edge of the closure member is clamped therebetween in wind and watertight condition thereof, and separable fastener means under the bow securing the forward edge of the closure member thereto.

2. The combination recited in claim 1 wherein the forward edge portion of the closure member is flexible.

3. The combination recited in claim 1 including a rearwardly open channel member at the front edge of the cover, said channel member having portions embracing the bow generally at the top and bottom surfaces thereof.

4. The combination of a vehicle including a windshield having a frame therefor, said frame including a top generally horizontal member and said vehicle also including a retractable convertible soft top, said top including a forward bow which extends in general conformance with the top frame member of the windshield, and including interengaging means for latching said bow to said top frame member of the windshield in closed tight condition of the convertible top, said convertible soft top also having an opening therein extending generally from the location of the bow toward the rear to a point intermediate the ends of the convertible top, said opening terminating laterally short of the side edges of the top, leaving side edge portions of the top extending rearwardly from the bow;

with a closure member for said opening, said closure member being flexible and having a front edge, a rear edge, and connecting lateral side edges, the width of the closure member being substantially equal to the width of the convertible top and greater in extent than the width of the opening so that the side edge portions of the closure member overlap the side edge portions of the top at the location of the opening therein, means permanently securing the rear edge of the closure to the rear edge portion of the opening to the top, means detachably securing the forward edge of said closure member to said convertible top adjacent the bow, and means detachably securing the side edge portions of said closure member to the side edge portions of said convertible top, the closure member completely covering the opening and being retractable with the convertible top, and in turn extensible to the extended position of said flexible top, said closure member being detachable from the top at the front and the side portions thereof and upon being folded at the side edges is adapted to be withdrawn to a major extent through the opening to the under side of the convertible top, leaving the opening completely exposed.

5. The combination of claim 4 including a transparent window in the closure and an opaque shade selectively disposable to cover or uncover the transparent window when the cover is in place in the opening, and means securing the shade at one edge to the top under the top.

References Cited by the Examiner
UNITED STATES PATENTS

| 1,741,318 | 12/29 | Kroh | 296—99 |
| 2,009,445 | 7/35 | Gould | 296—99 |
| 2,072,766 | 3/37 | Orris | 296—99 |
| 2,410,332 | 10/46 | Ball | 296—137 |
| 2,479,825 | 8/49 | Fleischauer | 296—136 X |
| 2,617,681 | 11/52 | Hawver et al. | 296—117 |
| 3,028,194 | 4/62 | Werner | 296—137 |

FOREIGN PATENTS 1,168,409  12/58  France.

A. HARRY LEVY, *Primary Examiner.*